US008645844B1

(12) United States Patent
Strobel et al.

(10) Patent No.: US 8,645,844 B1

(45) Date of Patent: Feb. 4, 2014

(54) COMPARISON SELECTION, RANKING, AND ANTI-CHEATING METHODS IN AN ONLINE CONTEST ENVIRONMENT

(75) Inventors: Jeffrey Strobel, Marlborough, MA (US); Kevin Gulbrandson Kohrt, Hopkinton, MA (US); Robert Earl Beene, Brookline, MA (US); Michael J. Oort, Winchester, MA (US); Adam Morgan DerMarderosian, Bedford, MA (US); Lee Fyock, Sudbury, MA (US); Christopher Scott Eplett, Natick, MA (US)

(73) Assignee: OurStage, Inc., Chelmsford, MA (US)

( * ) Notice: Subject to any disclaimer, the term of this patent is extended or adjusted under 35 U.S.C. 154(b) by 1139 days.

(21) Appl. No.: 12/252,716

(22) Filed: Oct. 16, 2008

Related U.S. Application Data

(60) Provisional application No. 60/999,780, filed on Nov. 2, 2007.

(51) Int. Cl.
*G06F 3/00* (2006.01)
*G06F 3/048* (2013.01)

(52) U.S. Cl.
USPC ........... 715/751; 715/700; 715/235; 715/764; 715/781; 709/206

(58) Field of Classification Search
USPC .......................... 715/751, 234, 764, 700, 781
See application file for complete search history.

(56) References Cited

U.S. PATENT DOCUMENTS 4,046,992 A * 9/1977 Huhn et al. .................. 235/54 F
5,963,916 A 10/1999 Kaplan (Continued)

FOREIGN PATENT DOCUMENTS

AU 2004101054 A4 2/2005
WO 0150279 A1 7/2001

(Continued)

OTHER PUBLICATIONS http://en.wikipedia.org/wiki/Elo_rating_system.*

(Continued)

*Primary Examiner* — Steven B Theriault
*Assistant Examiner* — Peiyong Weng
(74) *Attorney, Agent, or Firm* — Clock Tower Law Group; Erik J. Heels; Michael A. Barley

(57) ABSTRACT

The invention includes systems and methods for conducting online contests of user-contributed media works and entertainment works. The invention includes anti-gaming or anti-cheating methods in such contests. The invention includes a method of providing an online media network for user-contributed content. The system quickly and accurately identifies quality content from a vast pool of user-contributed content. User-contributed content is rated by those who contribute and those who view content. Good entries bubble to the top, which means that users can find good music and videos easily. Fraud detection devices automatically detect and remove fraudulent ratings. Contests and prizes associated with specific categories of content provide incentives for contributors to provide quality content and rate many pairs of works. Identified top-rated content is made available individually, or as a continuous stream of user-contributed content. In contests of contributed media works, a pair of media works is presented to a user to be judged and receive an input on which media work is better and to what degree. The contest includes a two-stage rating system where rated media works are initially ranked using a statistical estimation methods, and then subsequently ranked using a ranked pairs or preferential voting process. Behavior and ratings from users are monitored and statistically compared to other users to identify anomalies for taking corrective action. The invention includes other mechanism to prevent users from gaming the system.

20 Claims, 4 Drawing Sheets

(56) References Cited

U.S. PATENT DOCUMENTS

| | | | | |
|---|---|---|---|---|
| 6,963,848 | B1 | 11/2005 | Brinkerhoff | |
| 6,968,243 | B1 | 11/2005 | Oh | |
| 7,162,433 | B1 * | 1/2007 | Foroutan | 705/7.42 |
| 7,725,421 | B1 * | 5/2010 | Gedalius et al. | 707/702 |
| 2002/0120501 | A1 | 8/2002 | Bell | |
| 2002/0138362 | A1 | 9/2002 | Kitze | |
| 2002/0138471 | A1 | 9/2002 | Dutta | |
| 2002/0194066 | A1 | 12/2002 | Shultz | |
| 2003/0004749 | A1 * | 1/2003 | Toneaki | 705/1 |
| 2003/0171982 | A1 | 9/2003 | Paul | |
| 2003/0217171 | A1 | 11/2003 | Von Stuermer | |
| 2003/0227479 | A1 | 12/2003 | Mizrahi | |
| 2005/0240596 | A1 | 10/2005 | Worthen | |
| 2005/0240618 | A1 | 10/2005 | Nickerson | |
| 2006/0121989 | A1 * | 6/2006 | O'Kelley et al. | 463/42 |
| 2006/0212444 | A1 | 9/2006 | Handman | |
| 2007/0156507 | A1 | 7/2007 | Connelly | |
| 2008/0091509 | A1 * | 4/2008 | Campbell et al. | 705/10 |
| 2009/0083252 | A1 * | 3/2009 | Beatty et al. | 707/5 |

FOREIGN PATENT DOCUMENTS

| | | | |
|---|---|---|---|
| WO | 0167357 | A2 | 9/2001 |
| WO | 2005086043 | A2 | 9/2005 |

OTHER PUBLICATIONS

"OurStage: Pushing Bands Up the Long Tail" by Eliot Van Buskirk published Apr. 5, 2007.*

OurStage.com webpage published Aug. 31, 2007.*

Elo rating system, website, page from en.wikipedia.org/wiki/ELO__rating__system, Sep. 3, 2008, Wikimedia Foundation, Inc., San Francisco, CA, USA.

Ranked Pairs, website, page from en.wikipedia.org/wiki/Ranked__Pairs, Jan. 11, 2008, Wikimedia Foundation, Inc., San Francisco, CA, USA.

* cited by examiner

COMPARISON SELECTION, RANKING, AND ANTI-CHEATING METHODS IN AN ONLINE CONTEST ENVIRONMENT

CROSS-REFERENCE TO RELATED APPLICATIONS

This utility patent application claims priority from U.S. provisional patent application Ser. No. 60/999,780, filed Nov. 2, 2007, titled "Comparison Selection, Ranking, And Anti-Cheating Methods In An Online Contest Environment" in the name of Jeffrey Strobel et al.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2007 OurStage, Inc.

BACKGROUND OF THE INVENTION

1. Field of the Invention

This invention relates to methods and systems for identifying and providing top-rated user-contributed media content over a networked system. This invention also relates to providing contests for user-contributed content, and anti-cheating methods used in such contests.

2. Background

Online, user-contributed content has increased dramatically in popularity. An unprecedented volume of user-contributed content is being loaded onto the Internet daily. This volume comes from a broad cross-section of web users as millions of people are now posting content on the web. Social networking websites account for much of the traffic associated with user-contributed content.

There are several types of content that web users are contributing. One type of content is encyclopedic information. Websites, such as Wikipedia (www.wikipedia.org), allow users to write articles and explanations on numerous subjects. Another type of content is personal content. Social networking websites, such as myspace.com, allow individuals to post personal content to the world or to a network of contacts. Another type of content is opinion and editorial content. Websites, such as Blogger (www.blogger.com) and others, enable individuals to start a weblog to write and give an opinion on any topic. Another type of content is entertainment content. With wide consumer access to digital cameras and camcorders and other digital recording devices, web users can easily post amateur video, photography, and music. Websites, such as Flickr (www.flickr.com), enable web users to post and share photos. Websites such as Youtube (www.youtube.com) enable users to post amateur films, reality videos, music videos, and many other types of video content.

As millions of web users contribute videos, photos, songs, and performances, there are also millions who want to view the best user-contributed content as online entertainment. With millions of items of accessible content, there is a plethora of undesirable content. The challenge then is finding the best online user-contributed entertainment content from a sea of undesirable content. Users are essentially "surfing" content databases to find something interesting. Most of users' time is spent previewing many video clips in hopes of finding a few entertaining clips.

One solution for identifying desirable content, is to use professional reviewers or editors. Many websites list a category of content as "Editors' Picks" containing content judged as desirable, or as quality content, by a small group of paid reviewers. This solution for identifying desirable content suffers from several drawbacks. A professional reviewer system is time intensive and costly. With millions of items of content submitted, it is impractical for a small group of professional editors to review each submission. Also, to hire a sufficient number of editors to review all submitted content is cost prohibitive. Another drawback in such a system is relying on the opinion of a small group of individuals to determine what the masses desire.

Another solution for identifying desirable media and entertainment content is a computerized review system. In a computerized review system, evaluation by humans is replaced with machines, computer software or the like. Such computerization enables an entire pool of content to be evaluated at a low cost. The obvious defect in a computerized system is inability to review content on an emotional level to assess its entertainment value or appeal.

Another solution is a peer review system. The most plentiful resource available for rating user-contributed content is the contributors and viewers themselves. The collective time of millions of contributors can be used for rating the enormous volume of user-contributed entertainment content. In such a system, a contributor or viewer becomes a reviewer and is presented with a video clip or image and asked to rate the content. A website can also track viewing activities of users. Tracking activity and requesting ratings yields several groups of content. These groups include "Highest Rated", "Most Emailed", "Most Discussed", and "Most Viewed". Yet such systems suffer from several disadvantages.

One disadvantage of user review systems is the enormous potential for abuse. Websites that award money and/or prizes of real value attract a significant number of users whose sole intent is to game or cheat the system to win. Because users often compete against each other, there is an inherent conflict of interest that leads to fraudulent ratings. A common practice is for a user to rate works of other contributors with low scores in an effort to boost a user's own score. Another common practice is creating multiple fraudulent accounts for a user to rate his own submitted work with a high rating from several accounts. In another practice, a user with many social contacts can ask those contacts to view his content to increase the number of views which makes it more likely that such content will be included on a "most popular" group.

Another disadvantage of user review systems is providing an accurate and reliable ranking system using reviewers who are not expert reviewers. Traditionally, user review systems have used a scalar method of rating content. For example, a reviewer is asked to rate a work on a scale of 1-10. Averaging the individual ratings from reviewers provides a consensus, but this calculation erroneously assumes that the evaluation skills of each user reviewer are equal. Such an erroneous assumption often yields misleading or inaccurate results. The scalar method also suffers from dead-ends of the scale. If a reviewer scores an item as "10" on a scale of 1 to 10, and the next reviewed item is better than the last item scored as "10," then entered scores must be changed to compensate for the inaccuracy. Thus the scalar method asks a reviewer for an absolute score of an item without being able to simultaneously compare that item to all existing content.

Another measurement technique is a simple relative measurement scale. For example, a reviewer is asked to choose the better of A vs. B. Results are tallied from several A vs. B comparisons. While there are no dead ends with simple relative measurements, this technique less efficiently finds a consensus because it does not directly collect quantified ratings.

Another problem in identifying desirable content in the user-contributed entertainment industry is a lack of a clear content classification standard. Contributor-defined classification, or "tagging", is the primary method of identifying a genre for a video or image. Since most users would like their content to be viewed by as many people as possible, there is a tendency to use dozens of tags to define a clip. Such "tag stuffing" makes it difficult for viewers to search for desirable content as search results would present many clips that are incorrectly identified. This leads to a poor user experience.

Another problem with the user-contributed entertainment industry is that there is no lasting value for the contributors of content, beyond a temporary frame from other users viewing a clip. A problem for providers of websites that host user-contributed entertainment content is that there is a limited opportunity for advertising revenue. Major advertisers are generally wary of having their advertisements appear next to dubious, random, and potentially offensive content. With no level of comfort in type and quality of user-contributed content, advertisers are reluctant to advertise on user-contributed entertainment websites.

Therefore, what is needed is an online media network for user-contributed content that accurately identifies content that is high-quality, top-rated, and desirable for entertainment. What is further needed is such a network that provides an incentive to users to contribute desirable content and accurately rate content. What is further needed is such a network that provides a clear classification standard. What is further needed is such a system that prevents cheating and gaming within contests.

BRIEF SUMMARY OF THE INVENTION

The invention includes systems and methods for conducting online contests of user-contributed media works and entertainment works. The invention includes anti-gaming or anti-cheating methods in such contests. The invention includes a method of providing an online media network for user-contributed content. The invention provides a website or similar electronic network for receiving media works from contributors for any of various categories of media or entertainment. Media works and entertainment works include any creative work capable of being displayed or delivered electronically.

The invention selects and provides to contributors or users, a pair of videos, songs, or other media content, to rate. The invention also provides an interface for rating the pair of media works. The interface provides a mechanism for receiving a rating input, from a reviewer, that indicates how a first presented media work from the pair compares relative to a second presented media work from the pair according to a predetermined rating system. Pairs can be presented side-by-side, one on top and one on bottom, played in succession, or any similar presentation method. The rating system can use any standard or criterion for comparison. For example, the rating mechanism may ask a reviewer which of two clips is more humorous, which is better quality, which is more entertaining, or which is worst. Preferably the rating system asks which media content is best and by what relative degree or measure. The rating mechanism can include fields for receiving inputs, buttons, or a sliding scale with an icon that a reviewer can slide by degrees between two clips to indicate a better clip.

The invention identifies top-rated works for multiple media categories based on relative ratings received from reviewers. After receiving many relative comparisons, the invention weighs rating inputs and sorts rated works to identify a group of top-rated works. Good entries bubble to the top, which means that users can easily find good music, videos, and other content.

Top-rated media works can then be provided to viewers of user-contributed content. Top-rated works can be browsed, streamed or added to a play list. Viewers can manually create play lists, or create smart play lists. For example, top-rated works are identified by category and made available for selection by viewers. Sets of top-rated works, or viewer play lists, can be continuously streamed, back to back, upon a single click by a viewer, thereby providing an online entertainment channel of continuous, quality entertainment.

The invention includes a method of conducting a contest for competing media works. A contest for a particular type or class of media content is identified. A networked system receives media works from contributors for the identified contest. Competing contributors and/or viewers can rate submitted content. As described above, reviewers rate works on a relative scale based on a particular rating criterion or standard (for example, better "by far," "more," or "slightly more"). Rated works can be sorted from highest to lowest to determine a contest winner. Alternatively, a group of top-rated media works can be made available to viewers, along with a voting mechanism for viewers to vote on top-rated works to determine a winning media work. A time period for voting can be established. Any mechanism or method of receiving votes can be used. Ideally, votes are received either online, by phone, or through text messaging, but votes may be received through other electronic means.

The invention can offer cash and other prizes as incentives to users to contribute quality works and rate many pairs of works. Contributors may be charged a fee for uploading content, or charged for each identifier tag. Such fees reduce instances of tag stuffing and increase the quality of submitted content.

An important aspect of the invention is its method of collaborative rating. A system of comparisons (A vs. B) sorts items rather than the standard scalar method of rating and sorting (rating from one to ten). The system of comparisons includes variable measurement devices to accurately rate a large group of items of media content while the review load of each reviewer is relatively small. Additional devices, such as control works, prevent a reviewer from subverting the system by rating all works of others low, while simultaneously rating his work high. Reviewers that try to cheat the system in this and other ways are easily identified by the system.

The invention uses variable relative measurement techniques but provides an evaluator with multiple choices. A reviewer is not simply asked if Item A is better than Item B, but is asked how much better Item A is than Item B. This variable measurement technique allows the system to accurately rank results using fewer comparisons than is required with a simple relative measurement system. By receiving variable relative ratings, individual rating comparisons can be weighted. Reviewers themselves can also be rated to assess a level of expertise of each reviewer. By determining a level of expertise for each reviewer the system can apply a degree of weight for ratings from that reviewer. Ranking of works is initially driven by a statistical estimation process that lowers the number of ratings a reviewer must submit to create a highly accurate and sorted list. Subsequently, the invention uses a ranked-pair process.

The invention uses anti-gaming processes to improve contests. Users with multiple judging accounts are identified to prevent fraudulent judging. For a given content, the amount of battles that a user can judge can optionally be limited to prevent a disproportionate influence by any one user. Judging behavior of users is statistically monitored to identify anomalies suggesting potential malicious users, so that corrective action can be taken.

There are several possible embodiments of the invention, and several variations within each embodiment. In one embodiment, the invention is a computer-implemented method of conducting a contest for competing media works. An electronic system receives multiple media works from contributors for an identified contest. The contest has a first time period that covers a beginning portion of the contest. This first time period can also span the majority of the contest. The contest also has a second time period that covers an ending portion of the identified contest. The system has an interface that displays pairs of media works for a user to rate. This interface receives rating inputs from users or media reviewers. Rating inputs indicate how a first presented media work from a given pair compares relative to a second presented media work from the given pair according to a predetermined rating criterion or standard. The system records ratings received from media reviewers. For ratings received during the first time period of the contest, the system ranks media works from best to worst based on an Elo system of ranking, or similar system using statistical estimation. An Elo system, as used here, is any system that uses a scoring system to rank items, and after a given battle, compares expected results to actual results to determine changes in scores and thus rankings. For ratings received during the second time period of the contest, the system ranks media works from best to worst based on a Ranked-Pairs system of ranking, preferential voting, or equivalent process. The system then identifies a top-ranked media work as a winning media work for the contest.

Optionally, media works included in the second time period are limited to an amount of top-rated media works identified from the first time period. In the first time period, media works can be added to the contest after the start of the contest and be presented in battles a predetermined amount of times. Also, the number of battles recorded per user can be limited during the first period, and then having no limit in the second period. Ranking in the first period under the ELO system can use a K-factor that scales down as the contest progresses.

In another embodiment, the invention is a computer-implemented method of conducting a contest for competing media works, largely as described above, but with some differences. The system plays each media work in a given pair for a predetermined length of time before enabling a media reviewer to enter a rating. The system displays a new and subsequent pair of media works to rate by a given media reviewer only after receiving a rating input from the given media reviewer for a specific current pair of displayed media works. A same pair of media works can be reloaded to be judged until a rating is received.

In another embodiment, the invention is a computer-implemented method of holding a contest for competing media works. The invention provides an electronic system for receiving multiple media works from contributors for an identified contest. The system provides an interface for displaying pairs of media works side-by-side, and for receiving ratings from media reviewers for the displayed pairs of media works. These media reviewers have an identified account. Ratings received indicate how a first presented media work from a pair compares relative to a second presented media work from the pair. The system identifies whether the media reviewers have a previous account for rating media works. The system excludes ratings received from media reviewers having multiple accounts used for rating media works. The system then ranks rated media works from top-rated to bottom-rated based on included ratings received from media reviewers for the contest.

In another embodiment, the invention is a computer-implemented method of holding a contest for competing media works. The invention provides an electronic system for receiving multiple media works from contributors for an identified contest. The system provides an interface for displaying pairs of media works, and for receiving ratings from media reviewers for the displayed pairs of media works. The system recording ratings received from media reviewers, and records actions performed by media reviewers. The system statistically compares actions and ratings of media reviewers against actions and ratings of other media reviewers. The system identifies anomalies among actions of media reviewers to provide an opportunity for taking corrective action. The system then ranks rated media works from top-rated to bottom-rated based on included ratings received from media reviewers for the identified contest.

FEATURES AND ADVANTAGES

An advantage of the present invention is the reduced number of sorts required for accurate rankings. The present invention is initially driven by a statistical estimation process that lowers the number of ratings a reviewer must submit to create a highly accurate, sorted list. Subsequently, the invention uses a ranked-pair process. Optionally, the invention can minimize the work by including an item the reviewer has already seen when presenting another pair of items to compare. Contributors have an incentive to rate many pairs of media works, because the more often a contributor rates a pair of works, the more a contributor's work will be included in other pairs of works to be rated.

Another advantage afforded by the present invention is the practical elimination of fraudulent ratings. The combination of the variable relative rating system and control works scattered within groups of works, results in easy and automated identification of fraudulent ratings. The control works include real and/or fake works that are known to be high-rated or low-rated works based on a given rating criterion. If a reviewer gives a rating of a control work that is contrary to the known quality of that control work, then the system can mark ratings from that reviewer as fraudulent and not consider such ratings for calculations to determine top-rated works. Additionally, the invention can establish a fee for purchasing identifier tags on contributed content. By purchasing identifier tags, a contributor will be less likely to select dozens of tags to identify a clip.

Another advantage of the invention includes anti-gaming processes. The anti-gaming processes provide several benefits. No one user gets a significantly greater voice than an average user. Although a user may be presented with a battle containing a media item that the user has submitted, those battles are not counted. No user can judge in a manner that advances his/her own media item's rank by damaging the rank of a competing item ("burying"). Malicious users cannot damage the democratically-determined ranking of items in a channel. Users who create multiple accounts to subvert any of the above anti-gaming measures are detected and thwarted by ignoring battles for either the new account, the old account, or both.

Another advantage of the present invention is that it can offer frame and compensation to creators and contributors of media content, and provide a dramatically superior entertainment experience for viewers of user-contributed entertainment content. The invention quickly and efficiently identifies the best amateur video, music, modeling, and photography content.

Another advantage of the invention is improved advertising opportunities in a user-contributed entertainment content environment. The community rating process enables the invention to screen out objectionable content. With objectionable content excluded from streams of top-rated content, advertisers have a high level of comfort in advertising on such streams of amateur media content.

Another advantage of the present invention is eliminating the need to surf user-contributed content websites to find quality content. Instead of surfing, a visitor can simply search for a specific category and then have access to top-rated content without have to personally sift through thousands of items of worthless content. Instead of viewers wasting their time scanning millions of items of poor quality content, the collective judgment of the crowd is harnessed to quickly and efficiently separate great content from the sea of mediocre content.

Thus, the present invention creates an improved online entertainment network where visitors can easily find top-rated user-contributed entertainment content. A system of contests and variable relative rating comparisons helps to quickly and accurately identify top-rated content. The rating review load for each reviewer is small, yet the invention accurately identifies top-rated works while filtering fraudulent ratings. The true wisdom of the crowd is used to quickly identify desirable content. Top-rated items of content in a given "channel" or category can be streamed back-to-back to create an online entertainment experience similar to televised entertainment programming.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF THE INVENTION, INCLUDING THE PREFERRED EMBODIMENT

Operation

The following detailed description of the invention references the accompanying drawings which form a part hereof, and in which are shown, by way of illustration, specific embodiments in which the invention may be practiced. Other embodiments may be used, and structural changes may be made without departing from the scope of the present invention.

Figure 1:
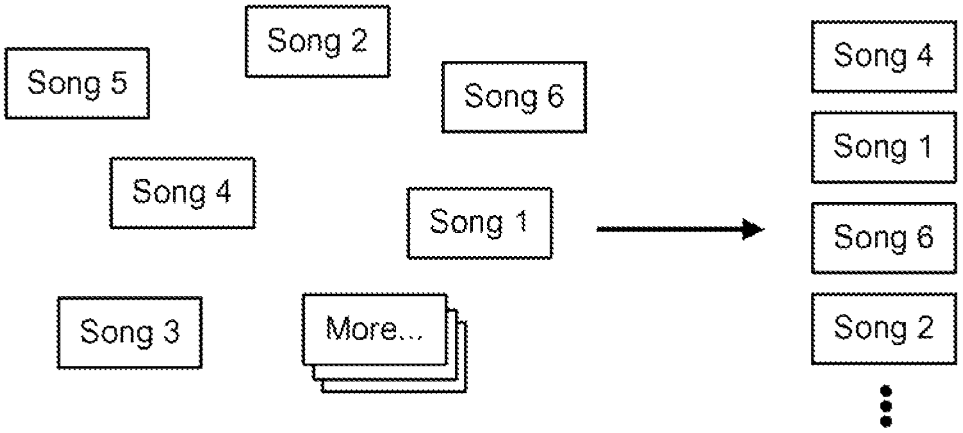
FIG. 1 is an illustration of the overall ranking process.

The preferred embodiment of the invention is embodied in a website for user-contributed media works and for holding contests to identify the best media works contributed. Other electronic systems besides websites may be used for receiving media works and holding contests. Contributors of media works, and other users of the system, become media reviewers by comparing and rating media works in a given contest. Contests operate by presenting media reviewers with two entries from a given contest. Preferably, the two media works are displayed side-by-side, but may be displayed other ways, such as in succession, or in groups, to be ordered by the reviewer. Media reviewers sample, view, or read each of the presented media works, and then judge the entries by rating them relative to the other. This pairwise presentation of media works to rate is referred to as a "battle." After several relative ratings from several battles, the system sorts or ranks media works from best to worst. Good entries bubble to the top, which means that users can find good music and videos easily. This is illustrated in FIG. 1.

Figure 2:
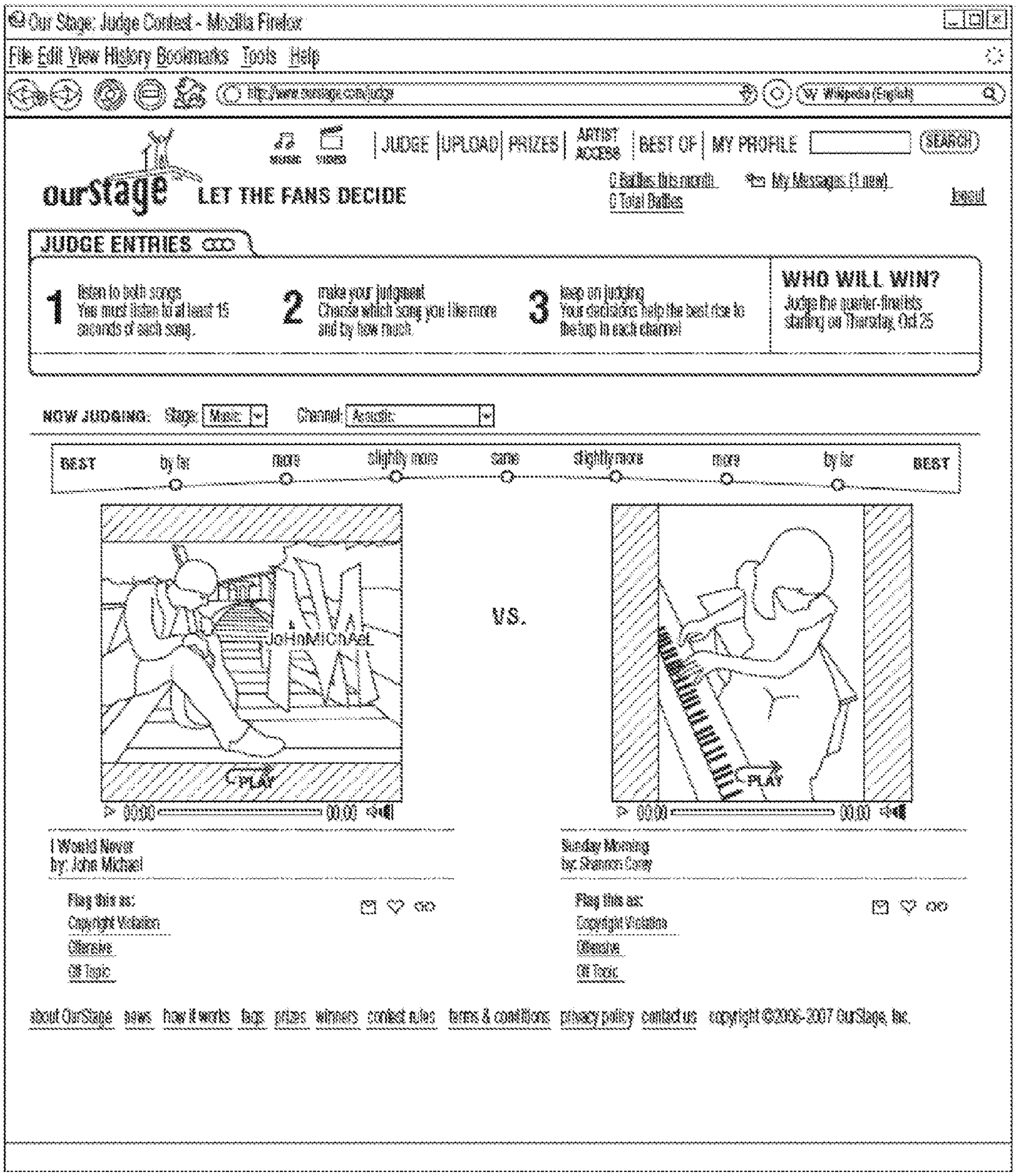
FIG. 2 is an illustration of a pair of media works presented for judging.

FIG. 2 shows an illustration of a battle presentation. When a media reviewer chooses to judge entries, a battle selection engine chooses a pair of entries to present, using one or more methods of selection. The judgment of a media reviewer is recorded, and afterwards that judgment is used to rank or re-rank the two entries among other entries in a particular contest or channel. Media reviewers initially choose from any number of broad categories of creative works such as music, video, modeling, and photography. Any number of entertainment genres can be used with associated subcategories. For example, the music genre can include channels for acoustic, indie/alternative, pop, rock, hip-hop, country, jazz, electronic, experimental, hard rock, world, rhythm & blues, metal, punk, Latin, reggae, and so forth. The video genre can include channels for animation, comedy, cutting edge, action sports, actor reels, music videos, short films, trailers, documentaries, and so forth. New categories or channels of user-contributed entertainment can be defined by users. The example battle of FIG. 2 shows two media works of acoustic music, A media reviewer can play each media work in any order. After listening to each media work, the media reviewer then indicates how the presented media works compare relative to each other. To indicate which work is better and by how much the work is better, there appears a selection bar above the works. A media reviewer can easily point and click to indicate which work is better, and whether it is better "by far," "more," or "slightly more." Alternatively, a media reviewer can indicate the works as "same" to designate that neither is better than the other.

Figure 4:
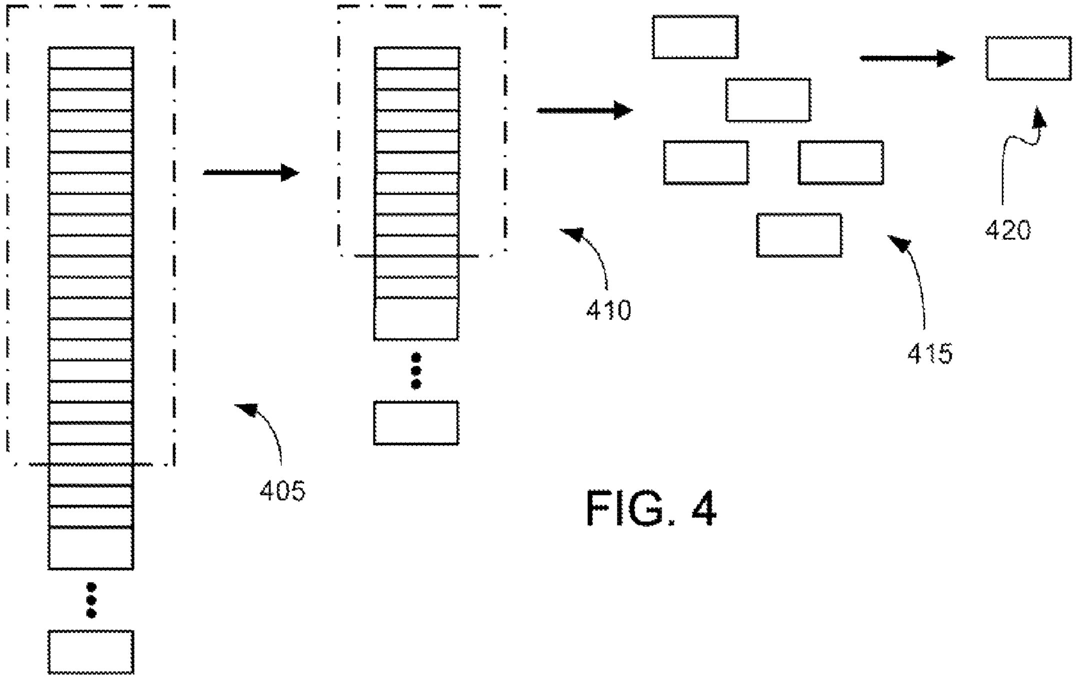
FIG. 4 is an illustration of the preferred endgame progression.

Contests can be structured in various formats. Preferably, contests use a playoff system and are active for one month. The duration of a contest can be based on any time period or based on numbers of received ratings. FIG. 4 illustrates the progression of a preferred contest structure. For approximately the first three weeks of a month, all media works or entries in a channel are judged in pair-wise battles. Entries are ranked according to ratings (via each entry's Elo score) so that the better media items rise to the top of the channel. New entries are permitted to join the pool during this time.

The top 20 entries are identified and selected to progress to the next round (405). Next, a four-day quarter-finals period limits judging to the twenty top-ranked entries in each channel. After quarter-finals, the ten top-ranked entries (410) in each channel enter a two-day semi-finals period to determine the best entry in each channel. On the last day of a month, each top-ranked entry in each channel is placed into a finals channel in each type of media work, such as music, video, or photography, to allow users to judge the top songs or the top videos (415) against each other, to determine the grand prize winners (420) for a particular genre or type of media work.

As embodied on a website system, the invention can be divided into three components: (1) a selection engine, (2) a ranking engine, and (3) an anti-gaming engine.

Selection Engine

The selection engine is responsible for presenting a pair of media items, such as user-contributed music or video, to a media reviewer or user of the system. The user picks one media item he likes best from the pair of media items after sampling the presented media. The user can pick from "by far," "more," or "slightly more" for the media item he prefers, or "same" if he likes or dislikes the two items equally. This user input is processed by a ranking method that factors in how much better one item is compared to the other.

Various selection methods can be used with the invention. The preferred method selects a random pair of items from a given media channel on the site. Preferably, these are media items that the user has not previously judged. Also, these are media items that the user has not filed a complaint against, flagged as offensive, off topic, or as a copyright violation.

Once contests are underway, as new media items are added to the contest, a fixed percentage of item pairs presented to users (referred to as "battles") may contain these added media items until added media items have been in a minimum number of battles (preferably two battles). This ensures that newly entered items in each contest are judged rapidly enough for their appropriate rank to be determined in a timely fashion.

To protect against users rapidly going through battles to find selected media items that they might like to "vote up," the invention includes restrictions. Users must watch a video or listen to a song for at least a predetermined amount of time such as 15 seconds or 80% of the media item's duration, if it is less than 15 seconds. Similarly, a user cannot file a complaint against a media item without having viewed the item for the minimum amount of time—thereby thwarting efforts to rapidly get a new random pair of items to judge. Users must judge a battle in order to get a new battle. A user cannot simply hit "reload" in a browser to get a new battle. In a given media channel, the same battle will be presented to a given user until that user has judged that battle according to the previous restrictions.

There are several variations on selection methods. One such method gives items a better chance to move up in a queue. For example, when choosing a pair of items, the invention first selects one media item through any number of subprocesses (based on randomness, "newness" in the contest, number of battles previously experience by that item, ranked position, etc.), next the invention selects another item somewhere above it in the channel contest ranking (half-way to the top, five ranks higher, etc.). During quarter-finals, battle pairs are selected from only the top twenty items in a channel. During semi-finals battle pairs are selected from the top ten items in a channel, and during finals the top-ranked items from each channel are battled against each other for the grand prize.

Ranking Engine

Two separate ranking engines are used in the course of a contest. During an initial or beginning judging portion of a contest, the ranking process is based upon the Elo rating system, with some modifications. The Elo rating system is a system that rates or ranks items based on statistical estimation. See en wikipedia.org/wiki/ELO_rating_system. During an "endgame" period (quarter-finals, semi-finals and finals), a ranked-pair process is used to rank items. See en.wikipedia.org/wiki/Ranked_Pairs.

Elo Rating Process.

In general, each entry into a contest starts with a score of 1500 points. When a battle is scored, the change in each entry's score is based upon an expected result. For example, if entry A has a higher score than entry B, and entry A beats entry B, the resulting increase in entry A's score is not as great as an increase would be if entry B were expected to win. The invention modifies the Elo system in its use of the "K factor." The K factor is used to calculate the change in score for both the winner and loser of a battle. To reduce rapid changes in item ranks, or rapid changes in which items are ranked in the top twenty closer to the end of the contest period, the system scales the K factor from about 32 at the beginning of a contest period to a final value of about 16 at the end of the contest period.

The Elo system ranks players by how they perform against each other, as compared to how they are expected to perform against each other. That is, if a highly-ranked player beats a lowly-ranked player, neither of their respective ranks will change much, since that is the expected outcome.

The expected score for player A when playing against player B is given by the following equation, where R is the rank of a given player.

$$E_A = \frac{1}{1 + 10^{(R_B - R_A)/400}}$$

If player A scores S, their rank is updated using the following equation:

$$R'_A = R_A + K(S_A - E_A)$$

It is this K factor which controls how far a player's rank can change due to a single battle. The system reduces the K factor during the contest period to reduce the ability of late entries to move too rapidly through the ranks.

Ranked-Pairs Process

During the endgame of a contest, a ranked-pair (RP) process is used to rank items. Using the Elo process during endgame can allow the ranks of items to change too much for each battle, leading to excessive rapid fluctuation of the rankings during the endgame period. The top ten or twenty ranks are considered to be stable upon entering the endgame period. The ranked-pair process is very good at determining the statistically best item given enough battles between all the possible pairings of items. Ranked-pair is not used during normal judging since it is less able to provide meaningful results when there are many items to rank, and relatively few battles upon which to determine the ranks.

The invention generally follows the Ranked Pairs ranking procedure found on the Wikipedia page: en.wikipedia.org/wiki/Ranked_Pairs. The ranked pairs ranking procedure of the present invention includes four steps: (1) Tally the vote count comparing each pair of candidates, and determine the winner of each pair (provided there is not a tie); (2) Sort (rank) each pair by the largest margin of victory (first) to smallest (last); (3) "Lock in" each pair, starting with the pair having the largest number of winning votes, adding pairs to a graph as long as pairs do not create a cycle (which would create an ambiguity), such that the completed graph depicts the winner; and (4) Place the locked-in winner in the Final Ranking list, then remove it from the list of candidates and repeat (to find the next runner-up, etc).

In step (1) above, the invention uses statistical analysis rather than having every voter rank the full list of candidates as described for a typical implementation. This allows the invention to extrapolate what the majority of voters would decide based on a sampling of a subset of those voters. A Ranked Pairs ordering excels when a significant number of battles is expected. While rank order may change over time, the changes become less dynamic (both in terms of frequency of changes and the degree of rank displacement per change)

as more votes are cast and the probability ranges are decreased with increased sample sizes.

In step (2) above; the invention uses the degree of victory (based on the score of each battle) as a deciding factor when the margin of victory (expressed only in terms of wins and losses) does not provide sufficient data for sorting. The invention also takes into account the number of tie votes between two entries that battle, which has shown to improve resilience against the influence of reviewers who vote only for their preferred entry and vote all other entries as ties. In step (3) above, the invention "locks in" each pair of entries to create a non-ambiguous graph.

Anti-Gaming Engine

Websites that award money and/or prizes of real value attract a significant number of users whose sole intent is to game or cheat the system to win. In the present invention, such cheating primarily means attempting to win by means other than the democratically judged merit of the media items that users have submitted.

The anti-gaming engine provides several benefits. No one user gets a significantly greater voice than the average user. Although a user may be presented with a battle containing a media item that the user submitted, such battles are not counted. No user can judge in a manner that advances the rank of the user's own media item by damaging the rank of a competing item (also known as "burying"). Malicious users cannot damage the democratically-determined ranking of items in a channel. Users who create multiple accounts to subvert any of the above anti-gaming measures are detected and thwarted by ignoring battles for either the new account, the old account, or both.

Figure 5:
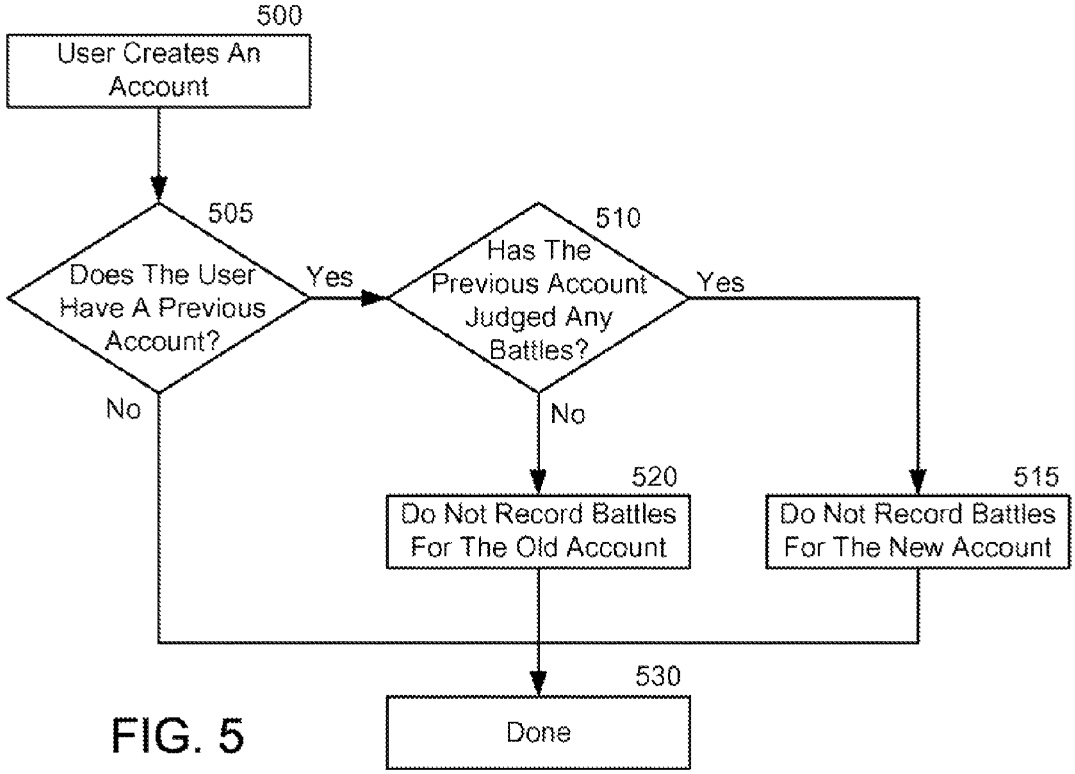
FIG. 5 is a flow chart for identifying users creating multiple accounts.

FIG. 5 shows a flow chart of how the system handles users with multiple accounts. A user creates an account (500). The system identifies whether the user ha a previous account (505). If a user has a previous account, the system determines whether the previous account has judged any battles (510). If the user has previously judged battles, then the system does not record or count battles judged from the new account (515). If the user has not previously judged battles, then any future battles judged from the previous account are not recorded or counted in ranking calculations (520). If the system does not identify a previous account, then the process is done (530).

In a preferred embodiment, when a user logs into an account on the website, a cookie is stored on the user's computer. The cookie records an account ID under which the user logged in. When the user creates a new account, the system checks for the cookie and gathers information about the previous account that the user was using.

During normal judging (judging up to the endgame portion), each user's battles in a given channel are recorded only up to a limit to prevent someone from unduly influencing ranking of items in that channel by battling through all possible combinations. This limit is preferably set to the number of items in the channel. For example, if there are fifty songs in a channel, only the user's first fifty battles are counted or recorded, and subsequent battles are ignored for ranking purposes.

During endgame judging, users can be permitted to battle every possible combination of entries.

The anti-gaming engine consists of routines that monitor and statistically compare each user's actions against the behavior of other users. When anomalies in actions are detected, and depending on information such as the severity of the anomaly, the system will either automatically take corrective actions, or the system will alert an administrator who can examine the anomalies and take the appropriate actions. For example, and administrator can suspend the account of a malicious user so that the malicious user may not log into the site for a specified time, or the user can be banned completely.

If suspicious judging behavior is observed, an administrator may hobble the user's account so that any future battles that user performs are either not recorded or counted. Similarly, if an administrator has determined that a user is doing a superlative job of evaluating items and ethically judging battles, that user's account may be "blessed," wherein that account is not limited in the number of battles that are recorded during normal judging.

Another approach to limiting the ability of malicious users to adversely affect rankings is to merely slow down their interaction with the site itself. Interaction is slowed by limiting their available bandwidth with the site, limiting the rate of interactions (HTTP requests) permitted to them, or other equivalent means.

In order to make judging a more pleasant process, entries that are deemed to be extraordinarily bad may be "weeded". That is, bad entries are excluded from the pool of entries used for battle selection, and these entries are given ranks at the bottom of their respective channels. Weeding may be performed at the discretion of an administrator, or through an automatic process that examines the cumulative judgment of users regarding that entry over time.

During judging, the system can inform users how well their judgment matches ratings of previous battles from other users. For example, a system interface can display "Most of those judging (68%) agreed with you." This percentage is determined from prior battles between the same two entries, when possible, or by comparing the relative ranks of the two entries.

Other Embodiments

In the music genre, Indie, amateur, and other musicians and singers participate in music contests. A nominal fee may be charged for each tag used to identify categories or contents in which an item is submitted. Such a fee charged can reduce spamming for submitted items. Contributors of items of music content have an obligation to rate items from other contributors. An incentive for a contributor to rate is that the more often a contributor rates the more often a contributor's item is presented to others to be rated. Presenting an item more often in pairs of content to be rated does not necessarily cause a particular item to become top-rated, but it does provide a more accurate rating because a larger portion of the crowd has had a chance to rate the item. For contests with cash prizes, there is an incentive to garner accurate ratings.

The music genre can be segmented by type of artist. Channels for recreational artists can include short video clips of singing auditions, karaoke video clips, music video contests, regional and local contents, and "worst of" channels.

In the video clip entertainment section, visitors can choose from any number of channels such as: stand-up comedy, original short films, wacky & weird, etc. As with other genres, the invention allows visitors to view top-rated videos in each channel—either individually or streamed continuously similar to television viewing. The invention can select a particular number of top-rated works, such as the top 100 rated clips, and stream these clips back-to-back upon a user making a single click to select a desired channel.

For a modeling genre, the invention provides visitors the ability to immediately view top-rated beautiful people. Channels or categories of modeling content can be identified by any factor. There can be contests for face shots, full body modeling, swim wear, casual wear, formal wear, ethnic dress, etc. People from different regions or groups can create their own contest and channels. Colleges, cities and other organizations can create their own beauty competitions.

As a marketing campaign, for example, companies can create a channel and contest for a best commercial for a company product and allow the general public to participate to win prizes. Schools can use the invention to create scholarship contests for dramatic arts. Cash prizes for contests depend on sponsors of the contest or creators of the contest. In another model, cash prizes may come from contributor submission fees. Contests may be initiated and ended at regular intervals such as having a new contest every month.

For contests, a winning item may be determined by community rating alone, or by community rating plus community and viewer voting. In the voting model, a group of top-rated items is first determined using the variable relative rating component of the invention. The group of top-rated items is then presented to viewers for voting. There are various rules that can be used for establishing a voting system including duration of voting and how votes are counted. In a simple voting system, viewers vote for a favorite clip or person from a group of top-rated items, and the item receiving the most votes wins. During contest voting periods, the invention may receive votes through several electronic means including text messages. Optionally, a premium text voting system may be offered that charges a nominal fee to vote by text messaging.

Contests can be regional, local, or customized based on various relationships among works. For example, people living in the city of Midway can set up a contest for the best comedy video clip, or the best baby picture. Any resident of Midway can contribute content, rate content, and vote on top-rated content. Other criteria for customizing contests can include high school or high school class, college, fraternity, state, company, organization, and social network group. For example, a company can customize a contest to determine a best employee-contributed video; a high school could set up a contest to determine a best school year theme or best looking couple; a state could set up a contest to find the best singer from the state; a group of international scientists could start a modeling contest to determine the most attractive scientist. Organizers of such contests can determine who or what group of people can contribute content, rate, and vote. Organizers can determine what type of content is acceptable for each contest.

For rating items of entertainment content, the invention uses a process of variable relative ratings for bi-directional, competitive, quality review. A peer rating engine operates through a website using the collaborative powers of the Internet to assess the quality of user-contributed entertainment content. The invention also provides contributors an option for receiving critical commentary. Content contributors review and rate each other's works, which works then become part of a ranked list.

The preferred mode of the rating engine is to assign works to be reviewed. This prevents contributors from conspiring to review works of co-conspirators. The rating engine has many alternative modes of operation. In one mode, the rating engine allows visitors who do not have content in the system to rate content.

In one embodiment, users, or a system provider, create a contest for an identified category or channel of entertainment content. Items are then received by the system for an identified category. The system then selects a pair of items to present to a reviewer and presents these items for review. A rating mechanism allows a reviewer to indicate how one item differs by comparison to a second item based on a given criterion. After receiving relative ratings from several comparisons, and top-rated items are calculated, top-rated groups of items of entertainment are then presented to viewers for voting to determine a winning item.

Figure 3:
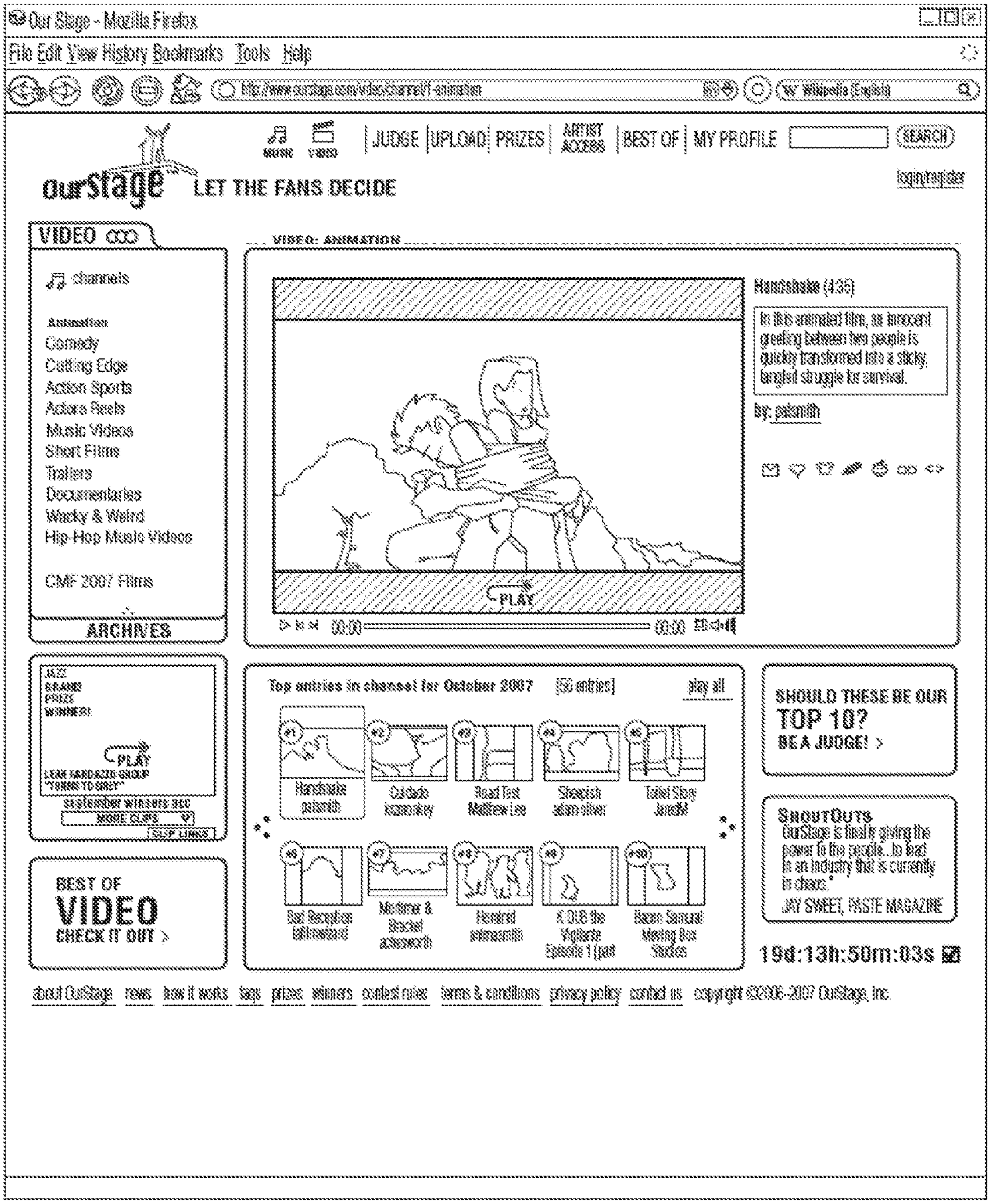
FIG. 3 is an illustration of a channel of media works displaying top rated entertainment.

The process for streaming top-rated content is similar to the contest process. Items are received by the system for an identified category. The system selects a pair of items to present to a reviewer and presents these items for review. A rating mechanism allows a reviewer to indicate how one item differs by comparison to a second item based on a given criterion. After receiving relative ratings from several comparisons, top-rated items are identified and grouped into ranked lists by category or channel. Top-rated items are presented to viewers and may be viewed individually, or displayed back-to-back as a continuous stream of entertainment. FIG. 3 is an illustration showing how top entries can be presented to users for entertainment.

There are many embodiments and variations of the invention that will be apparent to persons skilled in the art. While the preferred embodiment of the invention operates with entertainment content, the invention can be applied to related areas. Additionally, top-rated and winning songs, videos, and pictures may be downloaded for a fee. Record labels, movie studios, and modeling agencies can use the invention actively or passively to discover talent. Established music bands can use the invention to test or launch new songs. Movie studios can pre-release movie trailers and endings on a website using the invention to get feedback from the crowd before spending millions on a movie launch. Fashion designers can use the invention to run special modeling contests to test market new fashions on the site before spending millions on manufacturing clothing. Social networking websites can display channels of entertainment hosted by a website using the invention.

The above description is illustrative, and not restrictive. Many other embodiments will be apparent to those of skill in the art upon reviewing the above description. Determine the scope of the invention with reference to the appended claims, along with the full scope of equivalents to which such claims are entitled.

The invention claimed is:

1. A computer-implemented method of conducting a contest for competing media works, the method comprising:

providing an electronic system for receiving a plurality of media works from contributors for an identified contest;

identifying a first time period of the identified contest covering a beginning portion of the identified contest;

identifying a second time period of the identified contest covering an ending portion after the first time period of the identified contest;

providing an interface for displaying pairs of media works to rate, and for receiving a rating input, from a media reviewer, indicating how a first presented media work from a given pair compares relative to a second presented media work from the given pair according to a predetermined rating criterion;

identifying media reviewers that have multiple accounts with the electronic system;

recording ratings received from media reviewers having a single account with the electronic system;

for media reviewers having multiple accounts, recording ratings received from a prior account if that prior account has previously submitted recorded ratings, and from a later account if the prior account has not previously submitted recorded ratings, and not recording ratings received from other accounts of the same media reviewer;

for ratings received and recorded during the first time period of the identified contest, ranking media works from best to worst based on an Elo system of ranking;

for ratings received and recorded during the second time period of the identified contest, ranking media works from best to worst based on a Ranked-Pairs system of ranking;

identifying a top-ranked media work as a winning media work for the identified contest.

2. The method of claim 1, wherein media works presented as pairs for being rated during the second period of the identified contest are only selected from a predetermined amount of top-ranked media works identified at an end of the first time period of the identified contest.

3. The method of claim 1, wherein the second time period of the identified contest is further divided into two or more time periods having successively fewer media works considered in each time period.

4. The method of claim 1, wherein all media works accepted for the identified contest are presented to be rated at least a predetermined amount of times.

5. The method of claim 1, further comprising adding new media works to be rated, after a start of the identified contest, and incorporating such new media works in a pre-defined amount of battles during the first time period of the identified contest.

6. The method of claim 1, further comprising excluding ratings from a given media reviewer beyond a predetermined number of received ratings from the given media reviewer.

7. The method of claim 1, enabling media reviewers to rate every combination of media works during an endgame judging period.

8. The method of claim 1, further comprising identifying a top-ranked media work from each of multiple identified contests running simultaneously, and pairing the top-ranked media works from the multiple contests for rating and selection of a winning media work.

9. The method of claim 1, further comprising updating rankings after each received rating input.

10. The method of claim 1, wherein the Elo system of ranking uses a K-factor for ranking that is scaled down as the identified contest progresses.

11. The method of claim 1, wherein the predetermined rating criterion includes selection of variable relative rating comparisons.

12. A computer-implemented method of conducting a contest for competing media works, the method comprising:

providing an electronic system for receiving a plurality of media works from contributors for an identified contest;

identifying a first time period of the identified contest covering a beginning portion of the identified contest;

identifying a second time period of the identified contest covering an ending portion after the first time period of the identified contest;

selecting a pair of media works to rate;

providing an interface for displaying pairs of media works to rate, and for receiving a rating input, from a media reviewer, indicating how a first presented media work from a given pair compares relative to a second presented media work from the given pair according to a predetermined rating criterion;

playing each media work in a given pair for a predetermined length of time before enabling a media reviewer to input a rating;

displaying a new subsequent pair of media works to rate by a given media reviewer only after receiving a rating input from the given media reviewer for a specific current pair of displayed media works;

identifying media reviewers that have multiple accounts with the electronic system;

recording ratings received from media reviewers having a single account with the electronic system;

for media reviewers having multiple accounts, recording ratings received from a prior account if that prior account has previously submitted recorded ratings, and from a later account if the prior account has not previously submitted recorded ratings, and not recording ratings received from other accounts of the same media reviewer;

for ratings received and recorded during the first time period of the identified contest, ranking media works from best to worst based on a first identified system of ranking;

for ratings received and recorded during the second time period of the identified contest, ranking media works from best to worst based on a second identified system of ranking;

identifying a top-ranked media work as a winning media work for the identified contest.

13. The method of claim 12, wherein upon reloading a display of a given pair of media works to rate, displaying a same given pair of media works until receiving a rating input for the same given pair of media works.

14. The method of claim 12, wherein the pair of media works selected for a media reviewer to rate is a pair that the media reviewer has not previously rated.

15. The method of claim 12, wherein the interface displays pairs of media works side-by-side.

16. The method of claim 12, wherein media works for a given pair of media works are randomly selected.

17. The method of claim 12, wherein media works added to the identified contest after a start of the contest, are included in a fixed percentage of displayed pairs until the added media works have received a predetermined number of ratings.

18. A computer-implemented method of holding a contest for competing media works, the method comprising:

providing an electronic system for receiving a plurality of media works from contributors for an identified contest;

providing an interface for displaying pairs of media works side-by-side, and for receiving ratings from media reviewers for the displayed pairs of media works, wherein the media reviewers have an identified account, and wherein a received rating indicates how a first presented media work from a pair compares relative to a second presented media work from the pair;

identifying whether the media reviewers have a previous account for rating media works;

recording ratings received from media reviewers not having a previous account;

for media reviewers having a previous accounts, recording ratings received from the previous account if that previous account has previously submitted recorded ratings, and from a later account if the previous account has not previously submitted recorded ratings, and not recording ratings received from other accounts of the same media reviewer; and ranking rated media works from top-rated to bottom-rated based on ratings received and recorded from media reviewers for the identified contest.

19. The method of claim 18, further comprising maintaining a limit on a number of pairs of media works that a media reviewer can rate for the identified contest.

20. The method of claim 18, further comprising enabling media reviewers to rate every combination of media works during an endgame portion of the identified contest.

* * * * *